(12) United States Patent
Bicsák et al.

(10) Patent No.: US 7,207,038 B2
(45) Date of Patent: Apr. 17, 2007

(54) CONSTRUCTING CONTROL FLOWS GRAPHS OF BINARY EXECUTABLE PROGRAMS AT POST-LINK TIME

(75) Inventors: Attila Bicsák, Helsinki (FI); Ákos Kiss, Szeged (HU); Rudolf Ferenc, Szeged (HU); Tibor Gyimóthy, Szeged (HU)

(73) Assignee: Nokia Corporation, Espoo (FI)

( * ) Notice: Subject to any disclaimer, the term of this patent is extended or adjusted under 35 U.S.C. 154(b) by 631 days.

(21) Appl. No.: 10/651,839

(22) Filed: Aug. 29, 2003

(65) Prior Publication Data

US 2005/0060696 A1  Mar. 17, 2005

(51) Int. Cl.
*G06F 9/45* (2006.01)
(52) U.S. Cl. .................. 717/159; 717/157; 703/23; 703/21
(58) Field of Classification Search .......... 717/154, 717/155, 156, 157, 158, 159, 144; 703/23, 703/21
See application file for complete search history.

(56) References Cited

U.S. PATENT DOCUMENTS

| | | | | |
|---|---|---|---|---|
| 5,274,811 A * | 12/1993 | Borg et al. | ................ | 717/128 |
| 5,339,238 A * | 8/1994 | Benson | ................ | 717/159 |
| 5,450,575 A * | 9/1995 | Sites | ................ | 717/128 |
| 5,488,714 A * | 1/1996 | Skidmore | ................ | 717/143 |
| 5,557,761 A * | 9/1996 | Chan et al. | ................ | 717/156 |
| 5,613,117 A * | 3/1997 | Davidson et al. | ................ | 717/144 |
| 5,689,712 A * | 11/1997 | Heisch | ................ | 717/130 |
| 5,854,929 A * | 12/1998 | Van Praet et al. | ................ | 717/156 |
| 5,867,400 A * | 2/1999 | El-Ghoroury et al. | ................ | 716/1 |
| 5,896,521 A * | 4/1999 | Shackleford et al. | ................ | 703/21 |
| 5,911,059 A * | 6/1999 | Profit, Jr. | ................ | 703/23 |
| 5,918,035 A * | 6/1999 | Van Praet et al. | ................ | 703/22 |
| 5,920,721 A * | 7/1999 | Hunter et al. | ................ | 717/159 |
| 5,966,539 A * | 10/1999 | Srivastava | ................ | 717/156 |
| 5,999,732 A * | 12/1999 | Bak et al. | ................ | 717/148 |
| 5,999,737 A * | 12/1999 | Srivastava | ................ | 717/162 |
| 6,026,238 A * | 2/2000 | Bond et al. | ................ | 717/141 |
| 6,038,391 A * | 3/2000 | Kawaba | ................ | 703/21 |
| 6,044,222 A * | 3/2000 | Simons et al. | ................ | 717/156 |
| 6,061,513 A * | 5/2000 | Scandura | ................ | 717/142 |
| 6,067,412 A * | 5/2000 | Blake et al. | ................ | 718/102 |
| 6,195,748 B1 * | 2/2001 | Chrysos et al. | ................ | 712/227 |
| 6,282,701 B1 * | 8/2001 | Wygodny et al. | ................ | 717/125 |
| 6,367,033 B1 * | 4/2002 | Jibbe | ................ | 714/37 |
| 6,463,582 B1 * | 10/2002 | Lethin et al. | ................ | 717/158 |
| 6,772,106 B1 * | 8/2004 | Mahlke et al. | ................ | 703/21 |

(Continued)

OTHER PUBLICATIONS

Retargetable Generation of Code Selectors from HDL Processor Models, Rainer Leupers et al, IEEE, 1997, pp. 140-144.*

(Continued)

*Primary Examiner*—Todd Ingberg

(57) ABSTRACT

A method and a system for constructing a control flow graph (CFG, 106) from an executable computer program (104). The solution detects data intermixed with instructions and instruction set changes. The method includes the steps of defining block leader types specifying basic block boundaries in the program (104), building a CFG structure (106) according to the basic blocks found in the program, and adding control flow and addressing information to the CFG (106) by propagating through the basic blocks and internals thereof. The CFG (106) may be then optimised (108) and a compacted executable (112) created as a result.

15 Claims, 15 Drawing Sheets

U.S. PATENT DOCUMENTS

| | | | |
|---|---|---|---|
| 6,934,935 B1 * | 8/2005 | Bennett et al. | 717/127 |
| 7,003,746 B2 * | 2/2006 | Hyduke et al. | 716/4 |
| 7,017,154 B2 * | 3/2006 | Haber et al. | 717/159 |
| 7,036,116 B2 * | 4/2006 | Haber et al. | 717/151 |

OTHER PUBLICATIONS

ISDL: An Instruction Det Description Language for Retargetability, George Hadjiyiannis et al, 1997, ACM, 4 pages.*

Move: A Framework for High Performance Processor Design, Henk Corporaal et al, ACM, 1991, pp. 692-701.*

Cosynthesis with the MOVE framework, Henk Corporaal et al, 1996, 6 pages.*

HMDES Version 2.0 Specification, John C. Gyllenhaal et al, Technical Report IMPACT-96-3, 1996, 82 pages.*

Elcor's Machine Description System: Version 3.0, Shail Aditya et al, HPL-98-128, Oct. 1998, 76 pages.*

"A Methodology for Decompilation" by C. Cifuentes et al XIX Conferencia Latinoamericana de Informatica, Buenos Aires, Argentine, Aug. 2-6, 1993, pp. 257-266.

"Compiler Techniques for Code Compaction" by S. Debray et al ACM Transactions on Programming Languages and Systems, vol. 22, No. 2, Mar. 2000, pp. 378-415.

* cited by examiner

CONSTRUCTING CONTROL FLOWS GRAPHS OF BINARY EXECUTABLE PROGRAMS AT POST-LINK TIME

FIELD OF THE INVENTION

The present invention relates generally to software engineering and program code representation and optimisation. In particular the invention concerns building of control flow graphs (CFG) from binary executable programs at post-link time.

BACKGROUND OF THE INVENTION

At the advent of modern computer programming era computer programs were typically so small in size that all the symbolic code for a single application could easily fit into a few screen shots mostly due to limitations set by reasonably low capacity memory chips used in low-end computers at that time. Memory space intended for free use by the applications could consist of some kilobytes only, thanks to high pricing of the memory chips. In the aforesaid type of context, it is evident that programming could be performed by a single person utilizing only a single source code file as program maximum size was very limited; no real benefits would have been gained from distributing either program functionalities to several files or programming work between several persons during the design phase.

As the memory capacity of computers eventually started to rise steeply, also programming techniques had to be developed further in order to exploit the opened up possibilities. Programmers noticed that certain parts, e.g. clearly separable instruction sequences like algorithms with distinct input and output parameters, of a program could also be used in some other applications later. In addition, the program should be differentiated to a number of parts to be handled advantageously simultaneously by experts of particular fields thereof to speed up the overall development work.

The obvious solution to deal with the problem is to divide the software under development into several modules the components of which carry some common characteristic factor. The modules are then compiled separately and linked together after compilation to form the final executable program. Although most compilers are able to perform some optimizations on the generated code, even modern contemporary software developing tools still provide quite limited code optimisation functionalities to the user; the range of the optimization is limited to a module or—more frequently—to a function inside the module. Generally, linkers that merge together the compiled modules do not perform further optimizations on the code. Therefore, factual global optimizations concerning all the program parts together are not performed.

Since merging everything into a single source file is usually not an alternative on the basis of the above considerations, a sensible solution—by provision that an internal representation is not already available—is to analyze the program and construct a control flow graph from it.

Cristina Cifuentes et al, see reference 1, have worked on binary code analysis. Their goal was to retrieve high language statements from binary code. The results were tested on Intel Pentium and Sun SPARC machines. Executable is not created from the CFG. Saumya K. Debray et al, see reference 2, have created a post-link time optimizer specifically for Alpha processors.

Building a CFG for a binary program is not a trivial problem, since high-level control structures usually do not exist at a binary code level. Moreover, there may be data intermixed with instructions, both of which should be handled separately. Additionally, situations can occur where the precise flow of control cannot be calculated because of indirection. Also, the integrity of address references needs to be preserved in order to be able to produce executable code after the optimizations have been performed. Finally, there are processors with multiple instruction sets; before an instruction can be analysed, the corresponding instruction set has to be determined.

SUMMARY OF THE INVENTION

The object of the present invention is to provide means for building a control flow graph from a binary executable and alleviate the problems listed above. The object is achieved with a method and a system arranged to perform the analysis required for constructing such graphs. The flow graph can be used to illustrate the program structure, be subjected to code transformations and finally act as a source for a new executable created from the modified code. A concrete useful application of the invention is to apply memory footprint reducing optimisations to the embedded system software.

The invention offers several advantages over the prior art as via the flow chart generated the memory footprint of the program can be reduced by appropriate transformations providing still functionally equivalent but just shorter code. In addition, the programs can be then optimised as a whole, not limiting optimisation procedures to a certain module or function at a time only. The method of the invention also supports constructing a control flow chart dealing with multiple instruction sets or data intermixed with instructions. Furthermore, the provided arrangement is flexible, sophisticated and easy to update or tailor to fit the user's needs or system requirements even better. The flow graph also clarifies the overall structure of the program when used as a pure analysis tool for the program run. Still further, the developed method is general in the sense that it is not dependent on any programming language, compiler or hardware provided that some basic requirements are met.

According to the invention, a method for constructing a CFG from an executable program the instructions of which belong to one or more instruction sets comprises the steps of
defining a number of block leader types including at least one type related to an instruction set change, block leaders specifying basic block boundaries in the program, said basic blocks including instructions or data,
building a CFG structure comprising basic blocks found in the program,
adding control flow and addressing information to said CFG by propagating through said basic blocks and internals thereof.

In another aspect of the invention, a system for constructing a CFG from an executable program, the system comprising processing means and memory means for processing and storing data, and data transfer means for accessing data, is arranged to define a number of block leader types including at least one type related to an instruction set change, block leaders specifying basic block boundaries in the program, said basic blocks including instructions or data, further arranged to build a CFG structure comprising basic blocks found in the program, and finally arranged to add control flow and addressing information to said CFG by propagating through said basic blocks and internals thereof.

The term "block leader type" should be interpreted broadly herein and it generally refers to a certain property that can be used to locate block boundaries and thus to separate a block from the adjacent blocks.

The invention is explained with an embodiment relating especially to control flow graph build-up in an ARM (Advanced RISC Machines)/Thumb RISC (Reduced Instruction Set Computing) environment. ARM is a 32-bit RISC processor with a total of 37 registers—31 general purpose registers and six status registers containing the so-called condition code flags—of which 16 general purpose registers and one or two status registers are accessible in a single processor mode. Thumb is a subset of the ARM instruction set (basically including most commonly used instructions) with a higher code density (ratio of computation to the amount of code) as Thumb instructions are only 16 -bits wide. Thumb compatible processor cores also support full 32-bit ARM instruction sets. The processor mode may be switched between the ARM and Thumb modes during program execution with a specific "BX" (Branch and exchange) instruction. A software product named ATOM (ARM-THUMB Object Code Minimizer) uses the method of the invention to build a CFG for mobile phone software compiled for the ARM/Thumb architecture thus enabling the compacting of the program code by utilizing memory footprint reducing techniques. The ATOM software extracts information and code from an executable file in order to build a CFG including the instructions and data nodes with address data and other info. The CFG represents possible flow of control during the program execution. It may be then exposed to code reduction techniques like varying code elimination and factorisation algorithms to produce a functionally equivalent but shorter code that is finally regenerated to form a revised version of the original executable. However, as the factual code optimisation does not belong to the scope of this particular invention, it is not discussed in detail.

BRIEF DESCRIPTION OF THE DRAWINGS

Hereinafter the invention is described in more detail by reference to the attached drawings, wherein.

DETAILED DESCRIPTION OF THE PREFERRED EMBODIMENT OF THE INVENTION

Figure 1A:
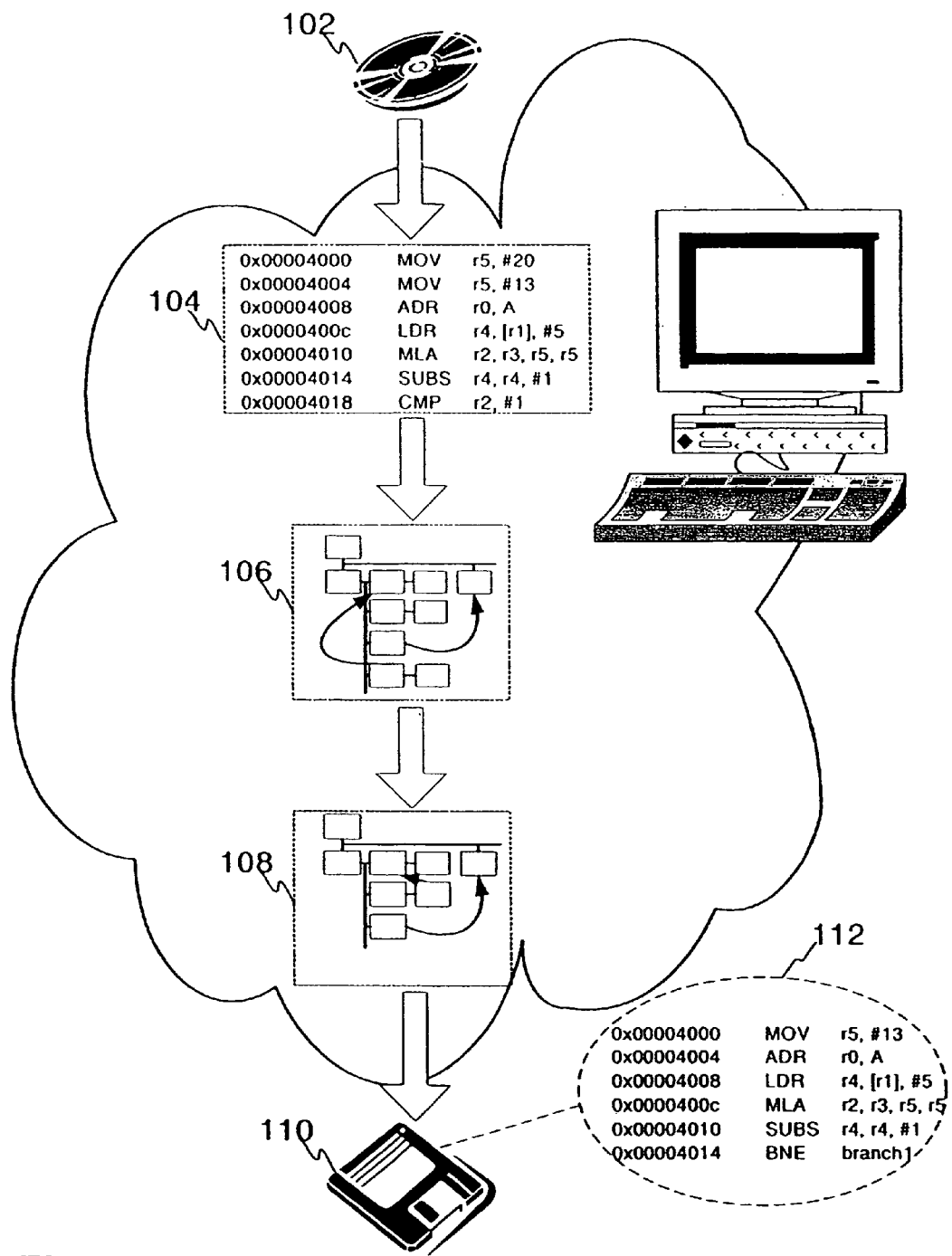
FIG. 1A illustrates the overall concept of the invention wherein an executable is analysed and a corresponding control flow graph formed.

The concept of the invention is illustrated in FIG. 1A. The executable program is first loaded to the system of the invention for analysis from the storage medium 102. However, the program structure cannot be seen very clearly if at all by just examining the already compiled and linked one-part code in a debugger application 104. Thus, to ease the evaluation of the program flow a CFG is generated by propagating through the code and by determining the hierarchy of basic blocks 106 comprising the instructions and data that make up the overall executable. The CFG may then be exposed to code optimisation techniques 108 in order to achieve a more compact presentation of a functionally equivalent program 112 that can be then exported from the system for further use 110 by other devices.

Still before going to the inner details of the embodiment, ATOM software, the method steps for creating a CFG according to the invention are explained with reference to FIG. 7A to facilitate further understanding of this relatively extensive application. At method start-up, see legend 702, the system executing the method of the invention, being substantially a computer, receives a command to generate a CFG from a user—designated file. Additionally, options like selecting a proper executable reader for the binary executable file type in question are set via e.g. software switches. Next, in phase 704 the binary program data is read from the file into a working memory of the system by utilizing the selected executable reader. The actual binary data analysis starts with determining the basic building blocks of the code. General binary executable file structure like a COFF file includes various sections that are substantially continuous ranges of addresses for e.g. program code, initialised variables and uninitialized variables (empty storage space). The method traverses through the sections and sets block leaders defining block boundaries 706; for example, function beginnings, instruction set switching positions and symbols marking constants between instructions are set as block leaders. Further details about determining leaders are described later in the text. The CFG basic structure is built in phase 708. The CFG comprises root (optional), section, function, basic block and instruction/data levels. It is built on top of the binary file structure; section nodes of the CFG following the initial root node are established on the basis of text and (initialised) data sections in the binary executable file. The gathered leader data is then basically used to split sections to functions comprising a number of basic blocks. Every leader starts a new block that is connected to the associated function node. Basic blocks include ARM/THUMB instruction or data nodes.

The CFG is still quite imperfect due to the missing program flow and therefore, a control flow algorithm based on a constant propagation technique is applied in phase 710 to complete the graph. In brief, the basic blocks containing instructions are first assigned with initial constant propagation information including values of all registers and condition code flags. Then the basic blocks are analysed one at a time by iterating through the instructions in the block and emulating their effects. The block behaviour after iteration is generally deducted from the last instruction of the block and emulation status at that moment. As a result the missing control (standard flow) and call edges (function calls) between blocks are added to the CFG. Constant propagation information is propagated between the blocks during the algorithm execution thus corresponding to the actual program flow from a block to another. Finally the address edges are inserted to the CFG from the source to the destination as explained later in the text.

Now, as the CFG being complete, it may be optionally subjected to various optimisation algorithms 712 like branch unconditionalizing and dead code elimination and converted back to a new, functionally equivalent but shorter executable 714. The method is ended in phase 716.

Figure 1B:
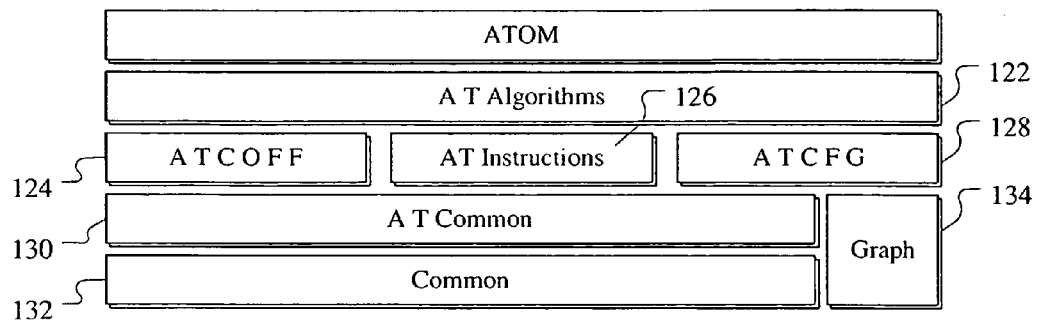
FIG. 1B depicts the internal structure of the ATOM software.
Figure 7A:
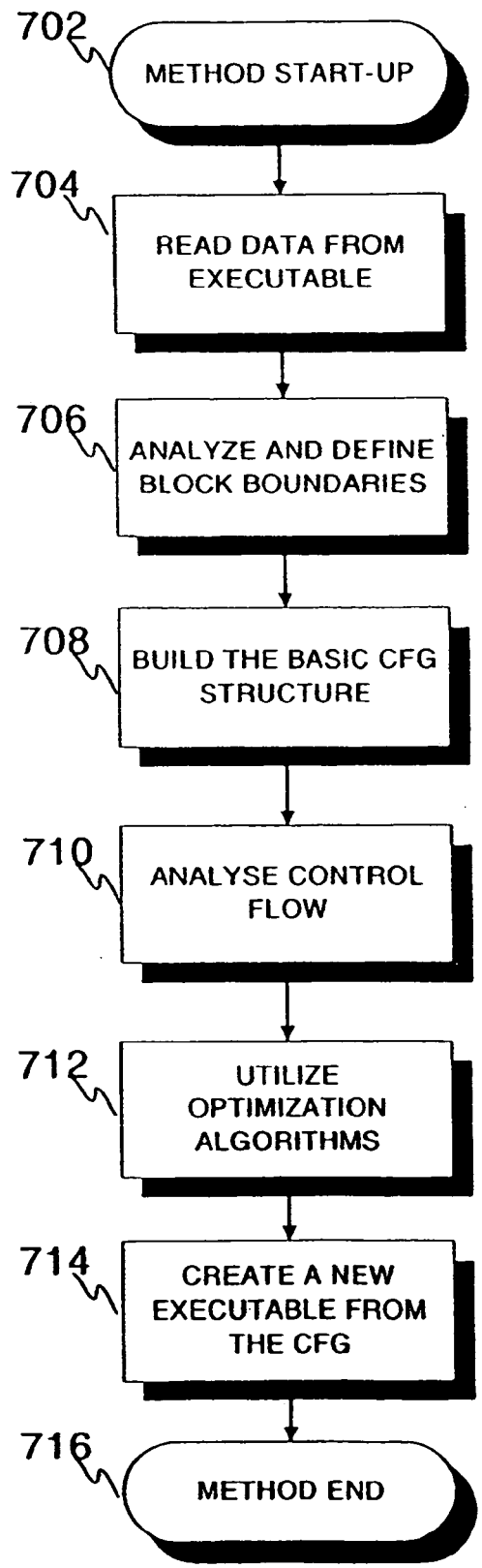
FIG. 7A discloses a high-level flow diagram of the proposed method for CFG generation and optional compaction.

The features of FIG. 7A are realized in practise via the ATOM software the internal structure of which is disclosed in FIG. 1B. It is made up by seven libraries and the main program that glues the separate parts together. Some of the libraries are general, while others are ATOM or especially ARM/THUMB architecture specific. Next, the libraries and functions thereof are recounted. The method steps for constructing a CFG are described in a detailed manner but optional support functions being in practise straightforward to realize by a person skilled in the art are presented more generally.

FIGS. 2, 3, 5, and 6 include standard UML (Unified Modeling Language) charts for visualizing ATOM internals. See reference 6 for info about UML notation.

General Purpose Libraries:

The following two libraries do not contain ARM/THUMB architecture specific code so they could be used in other programs/architectures as well.

Common Library 132

This library contains some frequently used code. It includes a simple and an enhanced command line parsing unit, code to help to manage versioning and vendor information about software, and a basic exception class.

Graph Library 134

Figure 2:
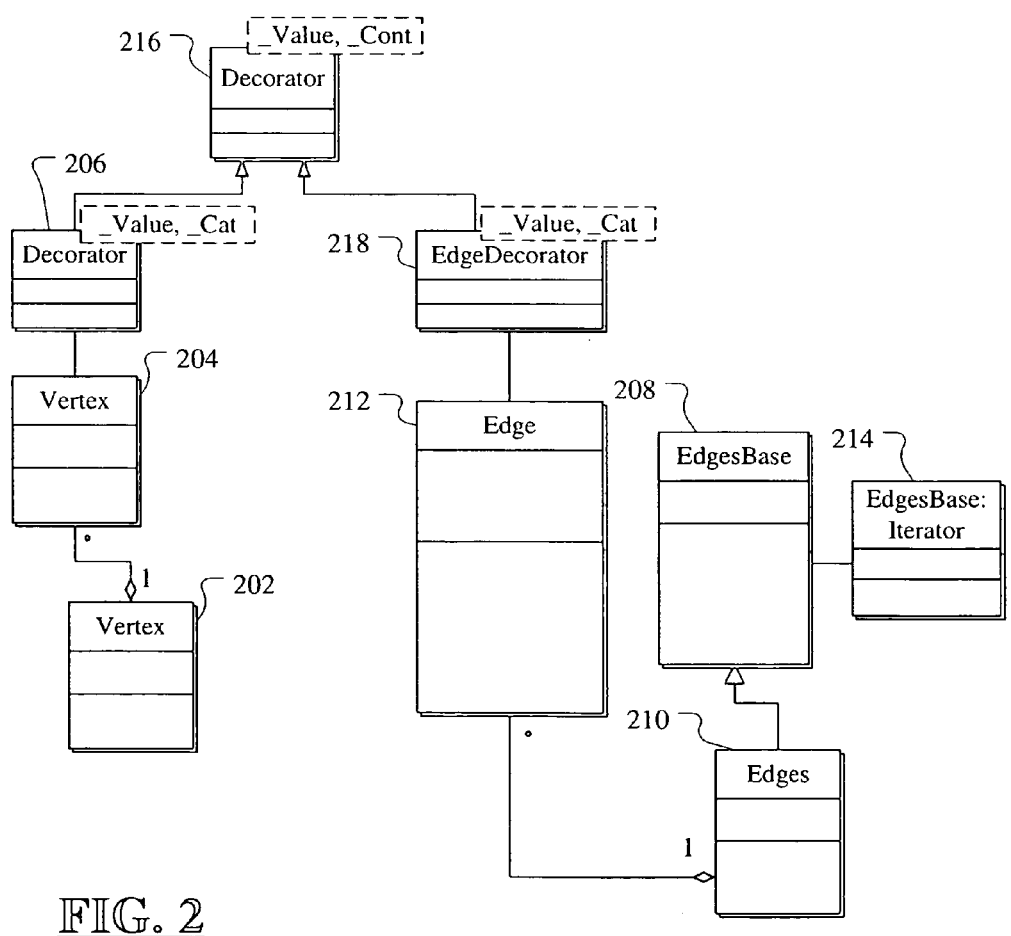
FIG. 2 discloses a UML chart of the Graph library in ATOM.

This library, see FIG. 2, contains classes that represent a generic graph. This graph is the foundation for storing the interprocedural control flow graph. A graph (class Graph 202) consists of zero or more vertices (class Vertex 204). Vertices have a unique identifier and a reference to the graph they belong to. Apart from this, they can be decorated with any user data using the template class VertexDecorator 206. This template class expects two parameters: 1) the user data type and 2) the container type of the data (optional). It provides index-operators for setting and accessing the data.

Relations between vertices are represented with edges. Due to technical reasons the edges are represented with two classes: EdgesBase 208 and Edges 210. The Edges class contains zero or more individual edges (class Edge 212). These edges can be traversed using EdgesBase's nested class iterator 214. Out- or in-edges of individual vertices can be iterated in the standard "STL" (Standard Template Library) way (with the operations begin, end, rbegin, rend, etc.). Class Edge 212 contains a unique identifier, a reference to the Edges collection it belongs to and references to the vertices at the beginning and ending of the edge. Similarly to vertices, edges can be decorated 218 with arbitrary user data. Note, that the main functionality of the decorators is implemented in their common base class Decorator 216, so this class can be used elsewhere in the system as well.

ARM/Thumb Specific Libraries:

The following five libraries are specifically developed to solve problems that arise during handling of ARM/Thumb instructions and compaction of ARM/Thumb code.

ATCommon Library 130

This library currently contains only an exception class, called ATOMException.

ATCOFF Library 124

Figure 3:
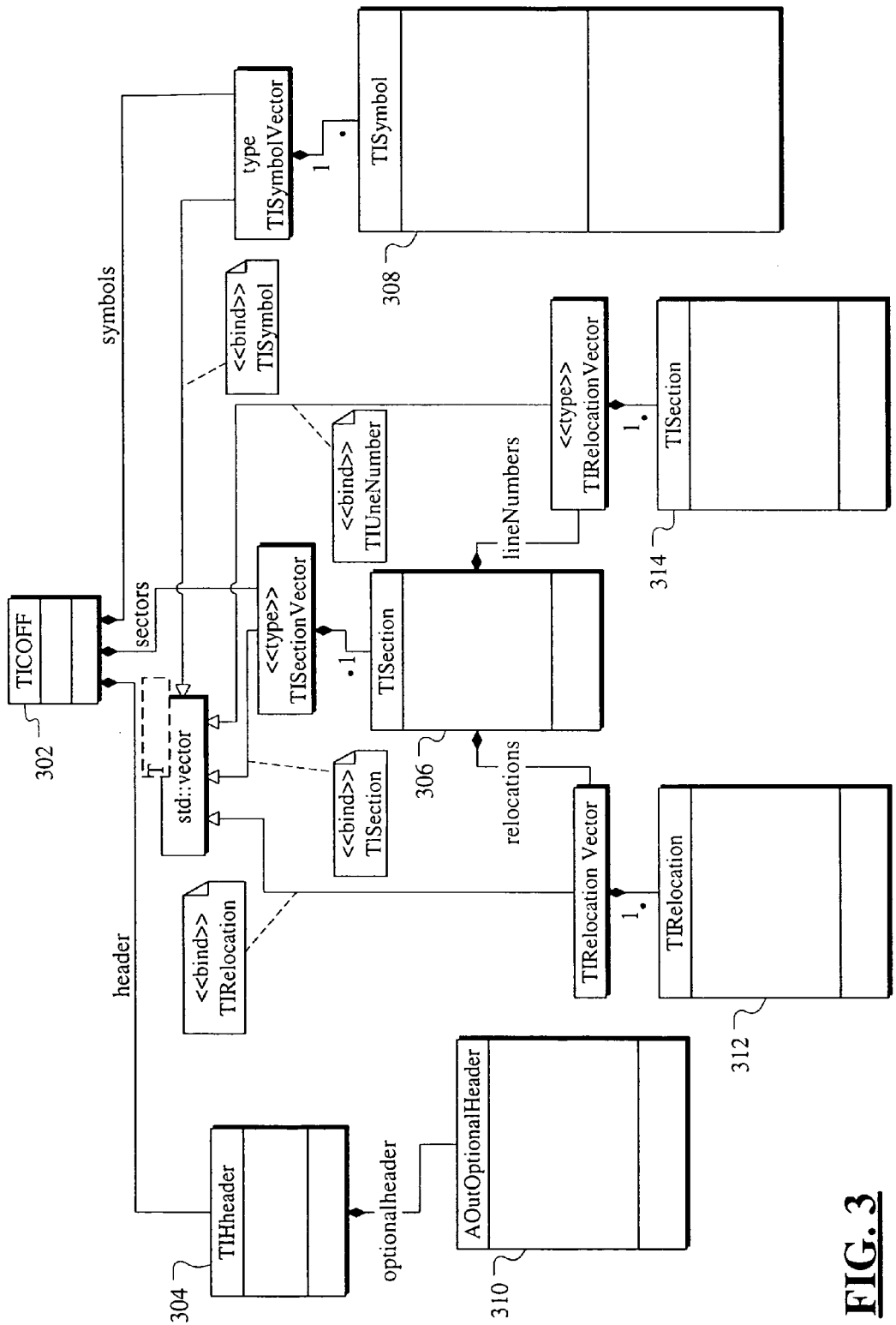
FIG. 3 discloses a UML chart of the ATCOFF library.
Figure 4A:
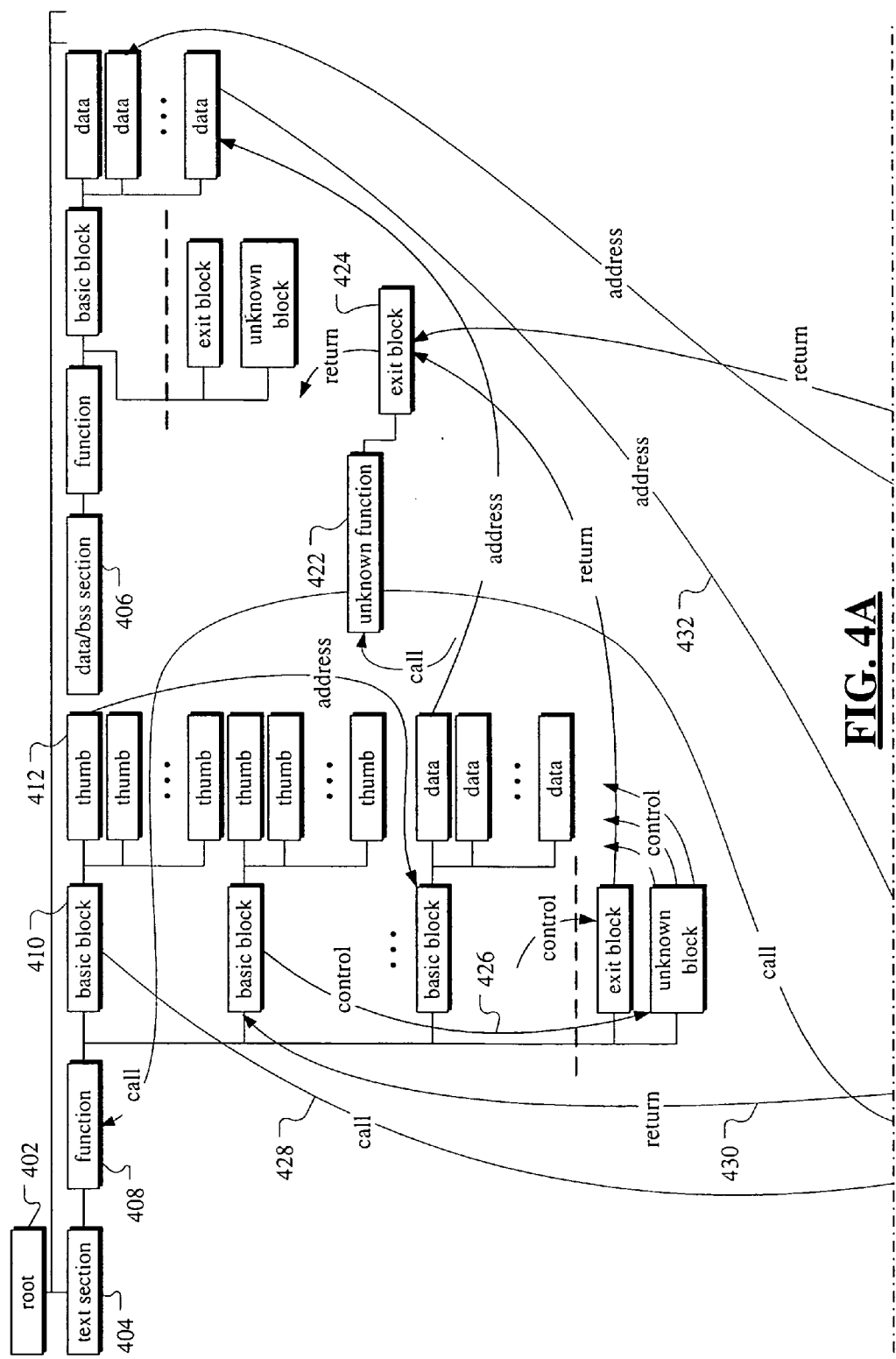
FIG. 4 discloses a chart of a CFG structure with necessary flow edges.
Figure 4B:
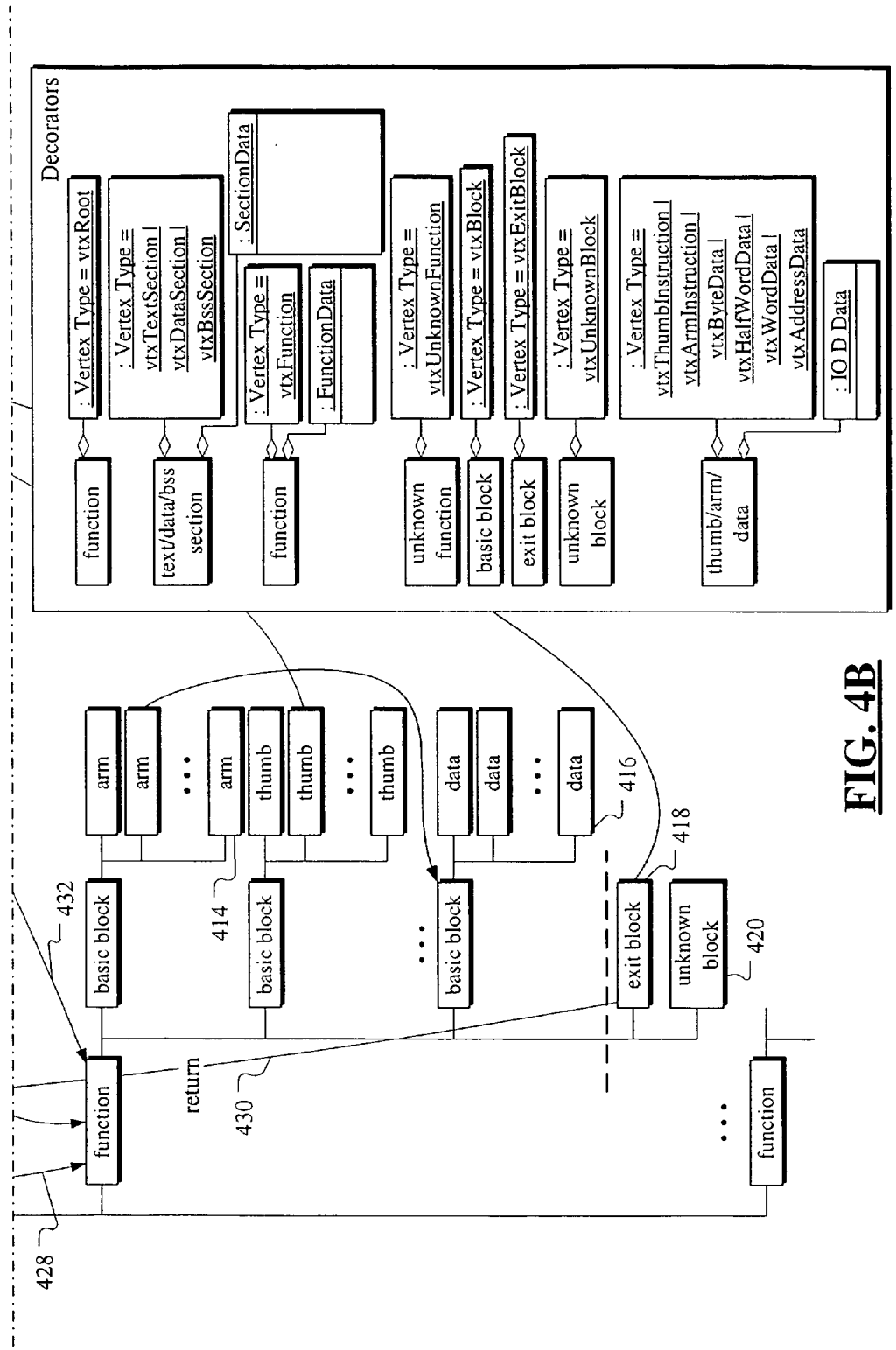
Figure 5:
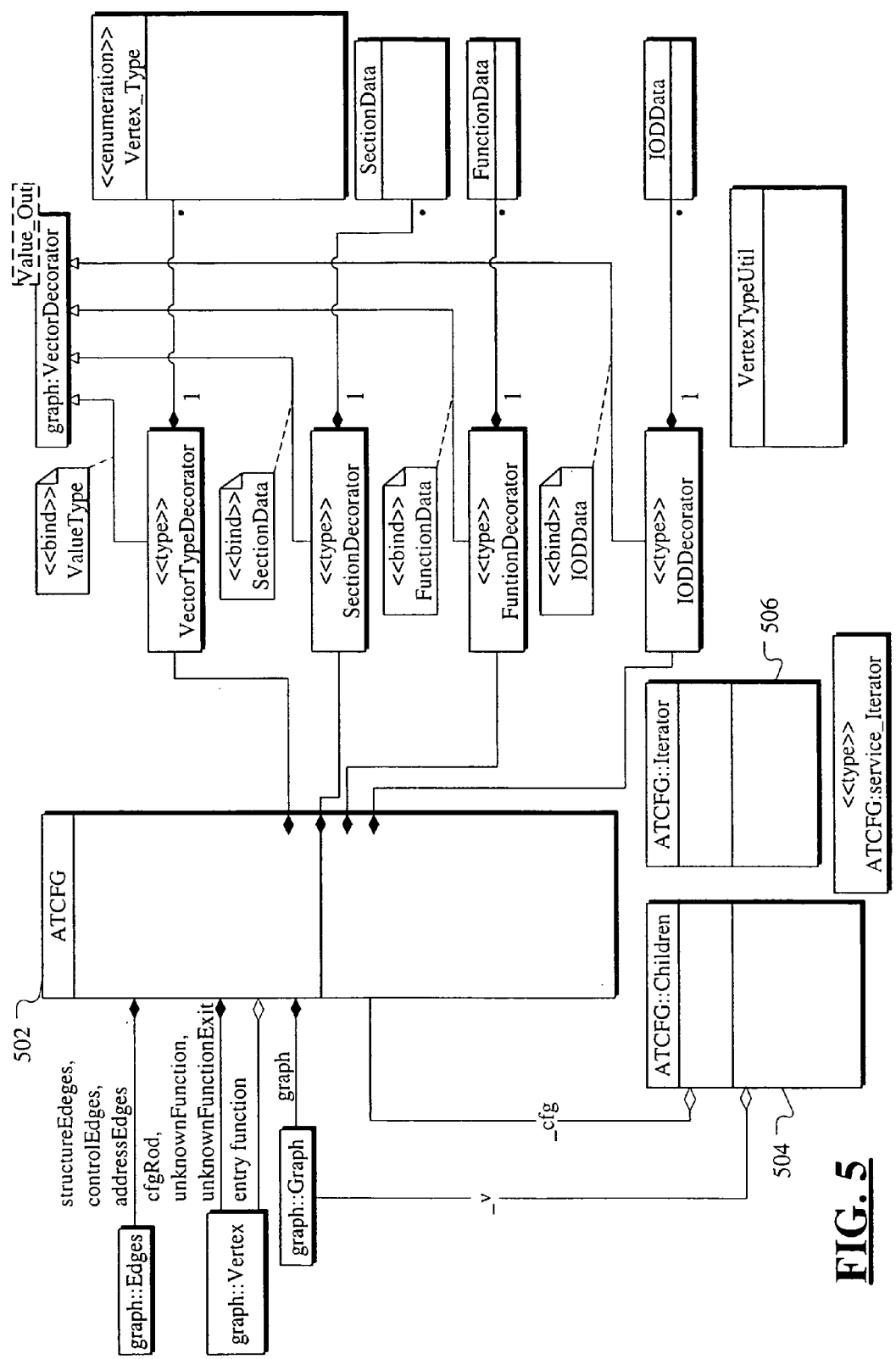
FIG. 5 discloses a UML chart of the ATCFG library.
Figure 6A:
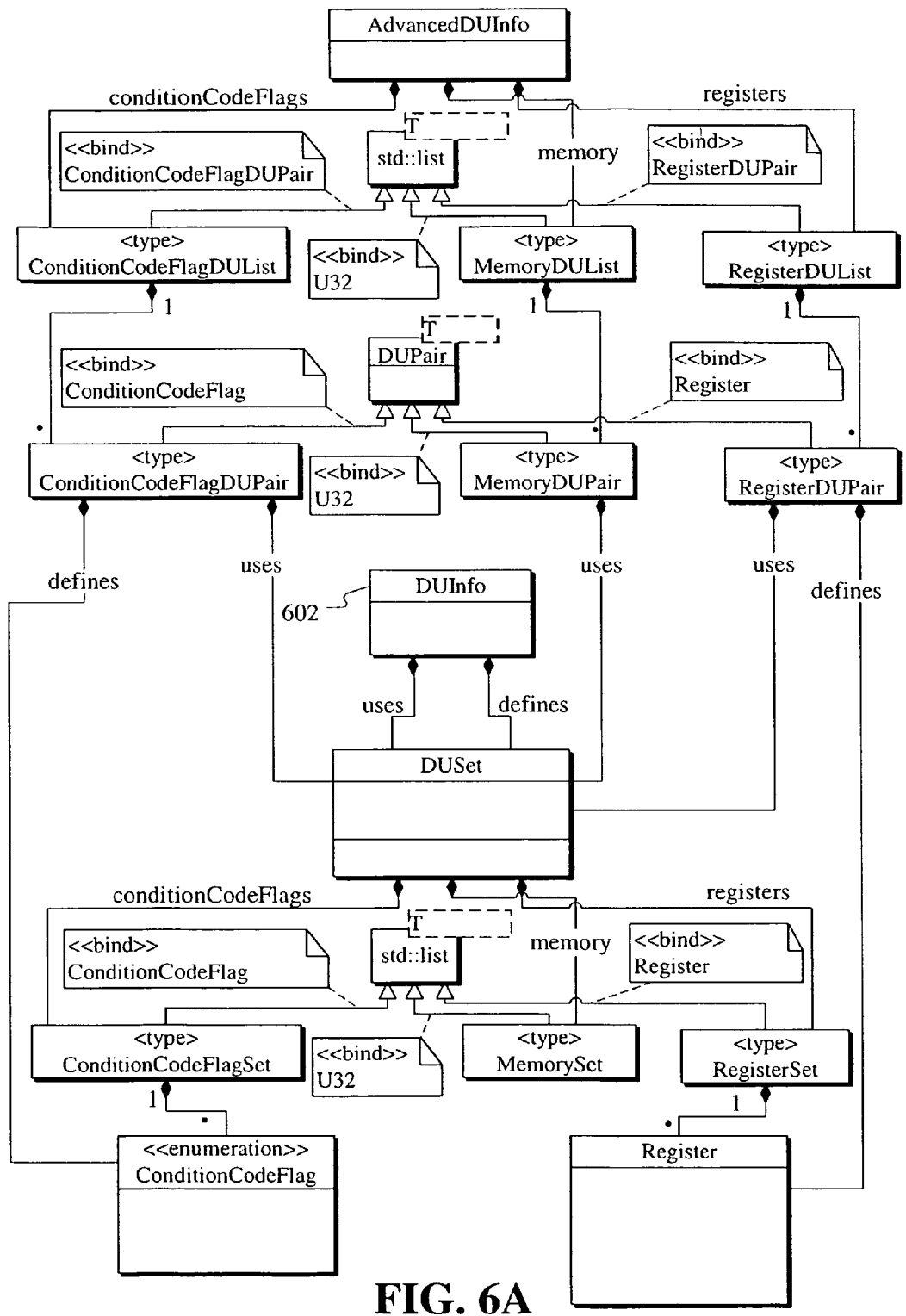
FIG. 6A discloses a UML chart of DU analysis part in ATOM.
Figure 6B:
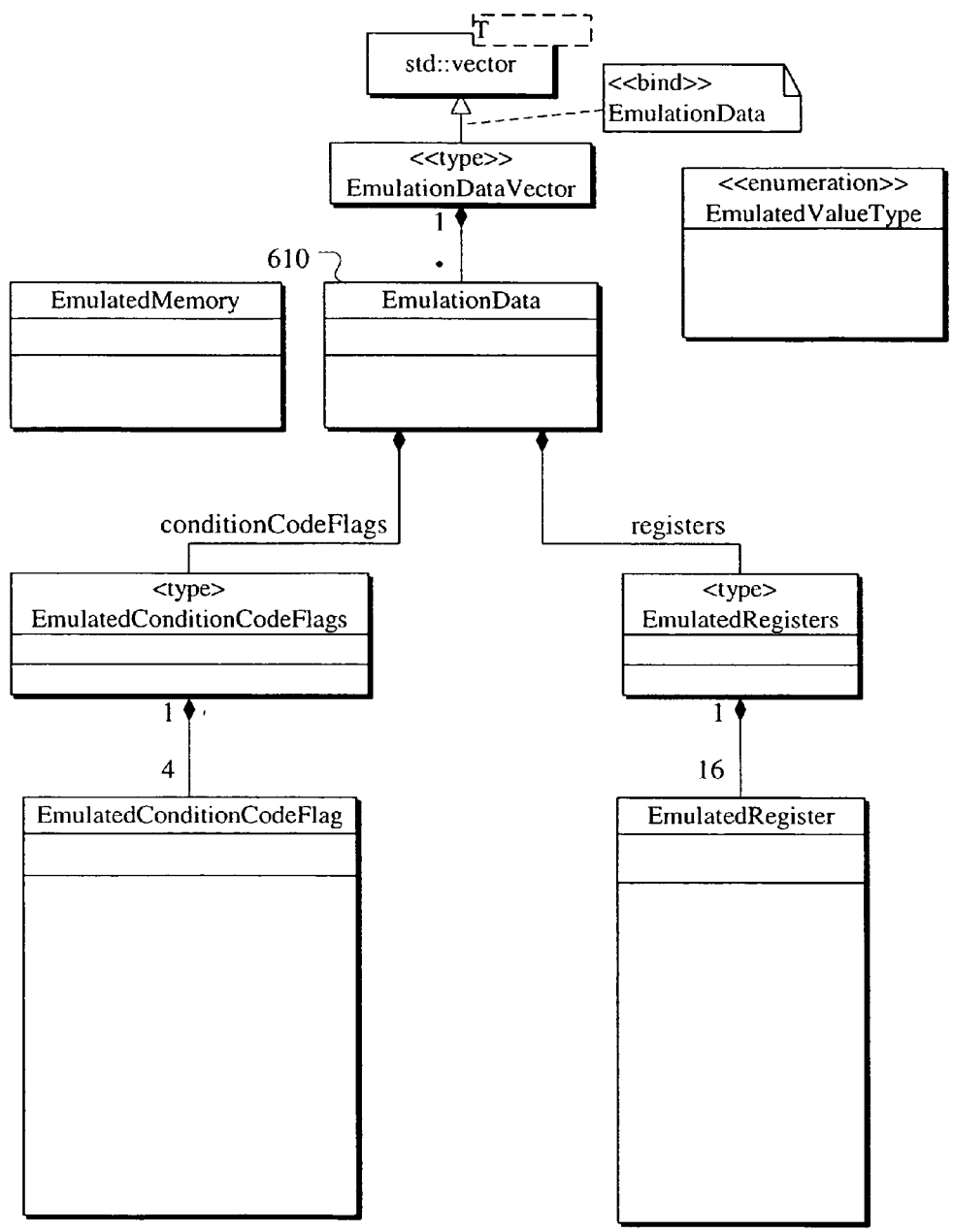
FIG. 6B discloses a UML chart of program run emulation structure in ATOM.
Figure 6C:
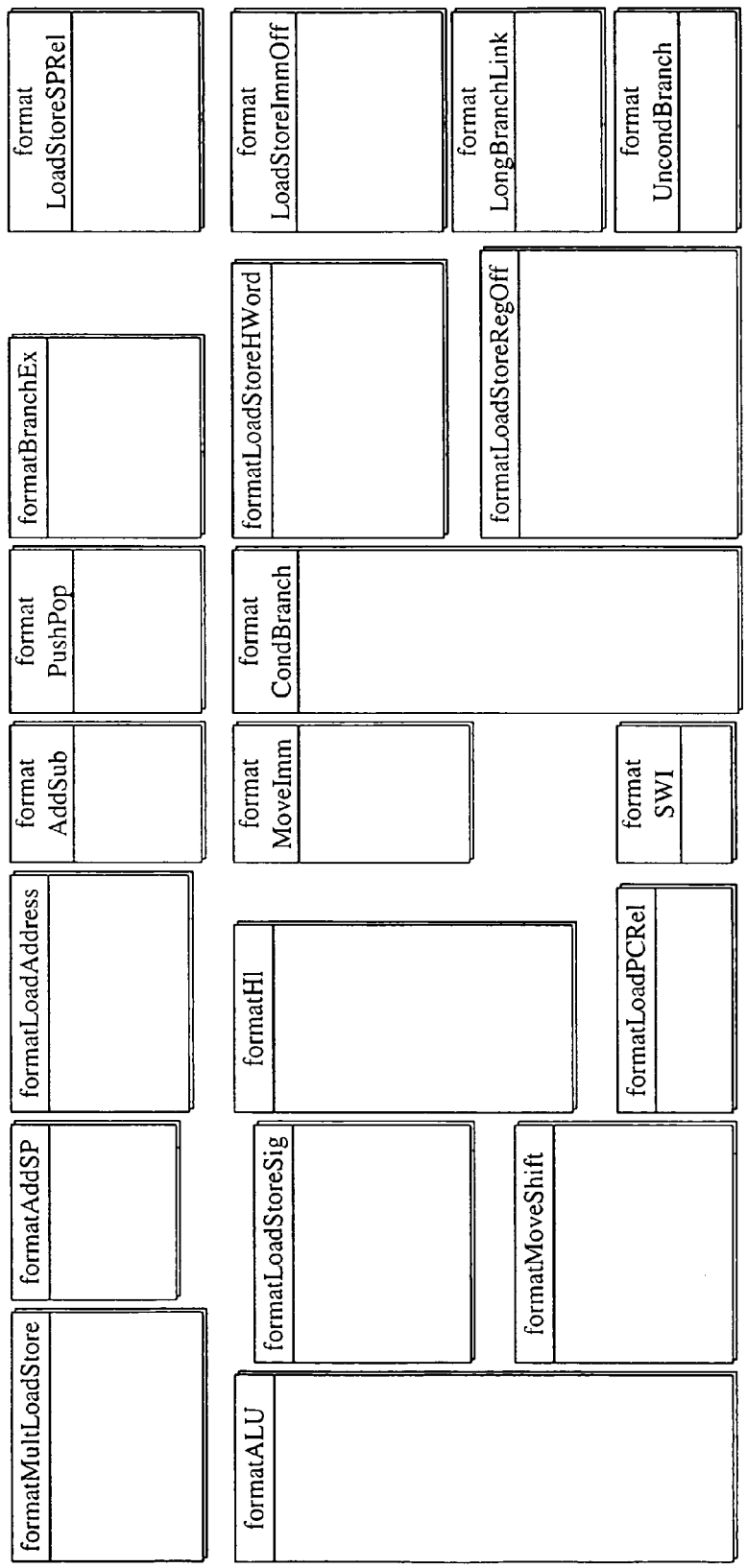
FIG. 6C discloses exemplary instruction break-down structures.
Figure 6D:
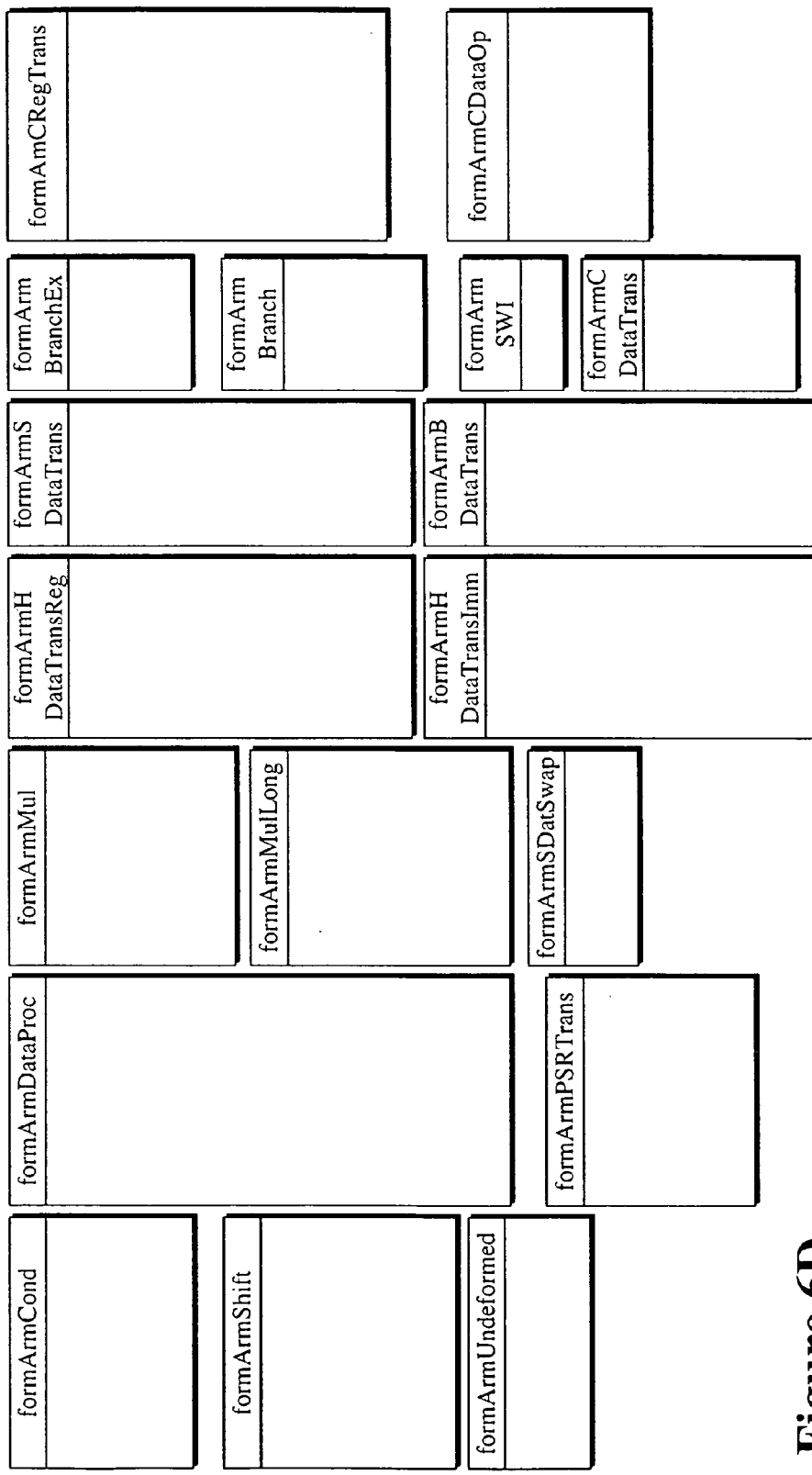
FIG. 6D discloses similar instruction break-down structures especially for ARM instructions.
Figure 6E:
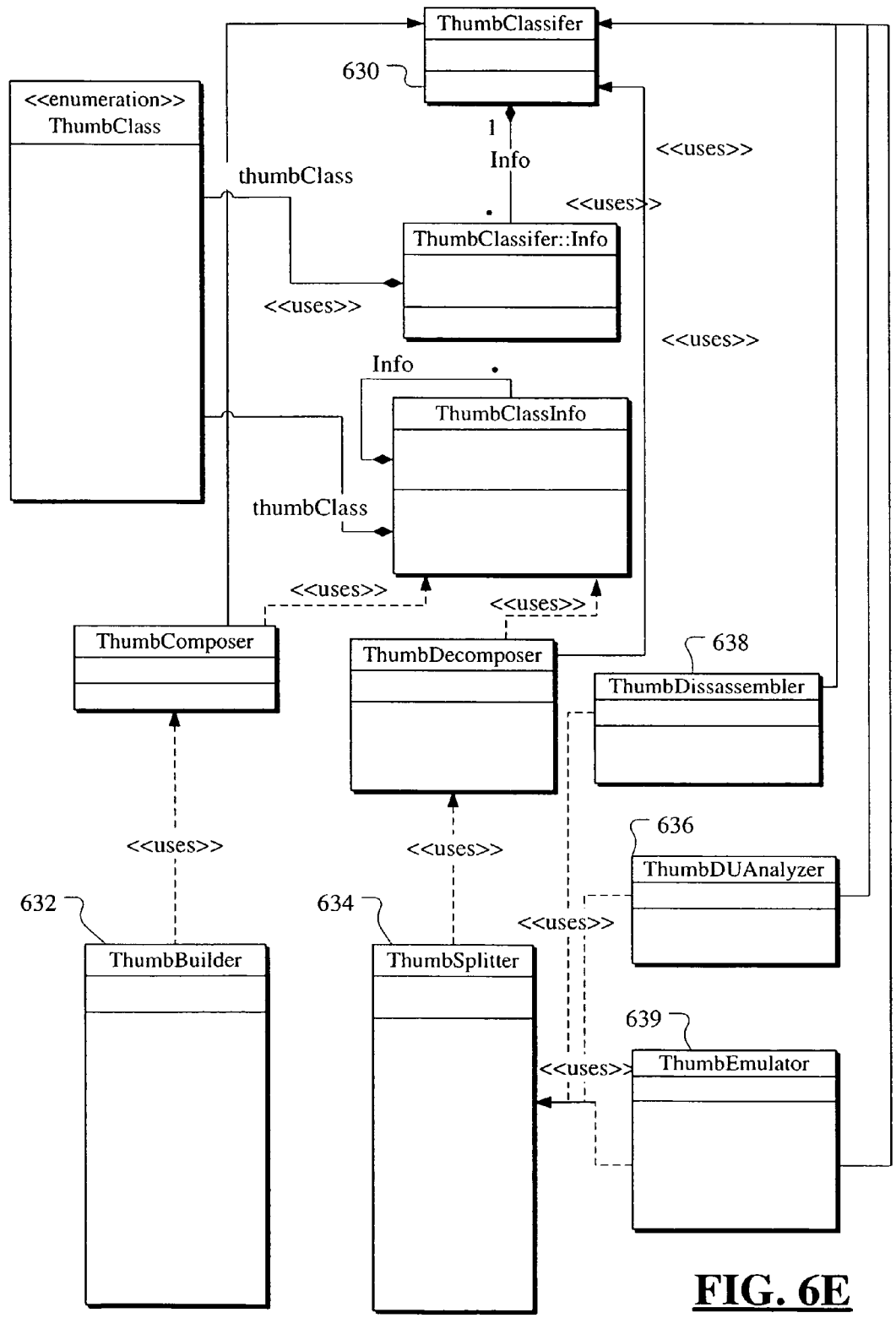
FIG. 6E discloses a UML chart of Thumb code classifier.
Figure 6F:
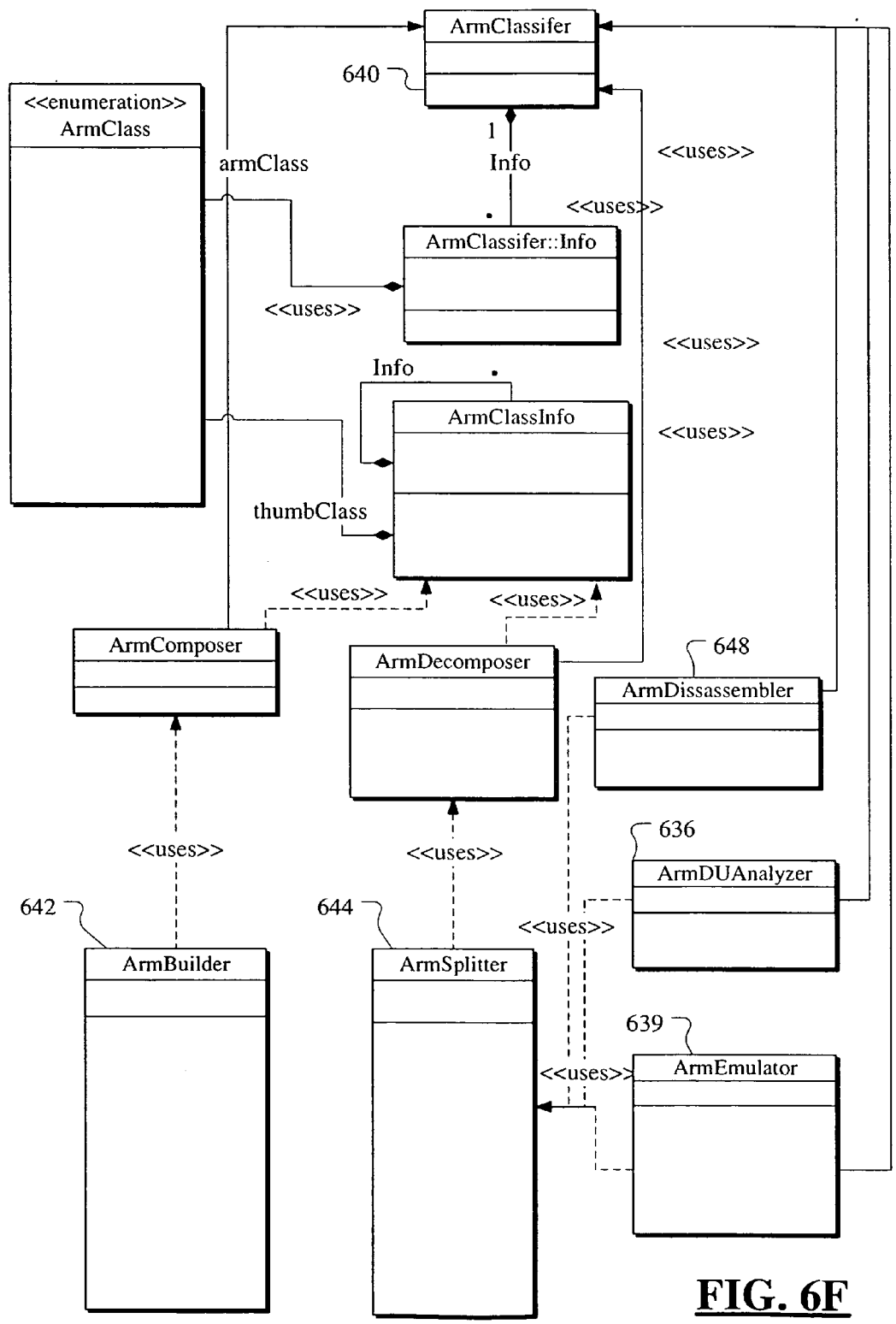
FIG. 6F discloses a UML chart of ARM code classifier.

ATCOFF library 124, see FIG. 3, contains classes TICOFF 302, TIHeader 304, TISection 306, TISymbol 308, AoutOptionalHeader 310, TIRelocation 312, TILineNumber 314 that support handling of COFF mutations supported by ATOM, illustrated classes being used to handle the mutation used by the tools of Texas Instruments, for example. Information on the COFF file format in general is available in reference 3, while information on the TI mutation of COFF is available in reference 4. ATCOFF library 124 is needed in order to load the executable program from the storage into the memory for analysis. In practise, the source executable may be in any format suitable for analysis, and the COFF and the TI mutation of COFF are referred to herein only for concretising the issue.

ATCFG Library 128

This library (FIG. 5) contains classes ATCFG 502, Children 504 and Iterator 506 responsible for the internal representation of the Control Flow Graph modeling ARM/Thumb code. The library heavily utilizes Graph library 134. The structure of the CFG is as follows (see FIG. 4).

The CFG has a root node 402, which contains section nodes as child nodes. There is a section node in the CFG for every section in the COFF file containing the executable that is loaded and is of type text 404 or initialized data 406. In every text section 404 a function node 408 exists for every function (non-label) symbol in the COFF file, and functions comprise basic blocks 410 of instructions. Every basic block 410 can contain Thumb instructions 412, ARM instructions 414 or data nodes 416. Function nodes 408 also contain two special child nodes: exit block node 418 and unknown block node 420. Exit block 418 represents logically the single exit node of the function and unknown block 420 represents the target of unresolved indirect jumps in the function. In every initialized data section 406 there is a 'dummy' function node, which contains a 'dummy' basic block node, which in turn contains all of the contents of the section as data nodes. This is needed to conform to the section-function-basic block-instruction or data structure of the graph. There is also a node not reachable from the root node of the CFG, unknown function node 422, which represents the target of all unresolved indirect function calls in the code; this unknown function node contains a special child node, exit block node 424.

Some nodes have data associated with them. Section nodes 404, 406 know the name and section number of the corresponding section in the COFF file and the physical and virtual addresses of the section. Function nodes 408 are also aware of their names. Instruction and data nodes 412, 414, 416 know their instruction code or value.

There are edges of various types in the CFG, which are connecting nodes. Control edges 426 represent the possible flow of control during execution. Control edges can connect nodes of various types. A control edge connects two basic blocks to represent that after the last instruction of the first block is executed the execution may follow at the first instruction of the second block. A control edge connects a basic block with the exit block of its function to represent that the last instruction of the given basic block is a 'return' instruction (i.e. it terminates the current function and returns the control to its caller). A control edge connects a basic block to the unknown block of its function to represent that the last instruction of the given block is a jump instruction whose target is not determinable. A control edge connects the unknown block of a function to a basic block of the same function if the basic block is a possible target of a jump with undetermined target in that function (i.e. it is relocatable, explained later in the text). Finally, control edges may connect exit blocks of functions to represent compensation.

Call edges 428 represent calls of a function from another function. Call edges can also connect nodes of various types. A call edge connects a basic block with a function if the last instruction of the basic block is a 'function call' instruction and its target is the said function. A call edge connects a basic block with the unknown function node if the last instruction of the basic block is a 'function call' instruction but its target cannot be determined. A call edge connects the unknown function to a function if the function is a possible target of function calls with undetermined target (i.e. it is relocatable).

A special type of call edges—return edges 430—connect the exit block of a function with a basic block to represent that the function may return control after execution to the block. A return edge is also present between the exit block of a function and the exit block of the unknown function if there exists a call edge between the unknown function and the function.

Address edges 432 connect instructions or data nodes to functions, basic blocks or other instructions or data nodes. An address edge denotes that the instruction has an immediate constant in its instruction code that refers the target of the address edge. If the source of the address edge is a data node then it denotes that the data node contains a direct reference to the target of the edge (the address of the target).

ATInstructions Library 126

This library is responsible for analyzing and building ARM and Thumb instructions, see FIGS. 6A, 6B, 6C, 6D, 6E and 6F. It includes code to classify instructions 630, 640, extract information from them 634, 644 and rebuild 632, 642 them. It also contains code that is able to analyze the DU (def-use) behavior of an instruction 602, 636, 646 (what condition code flags, registers and memory addresses it defines and what it uses, see FIGS. 6C and 6D for exemplary instruction break-down figures) or even to emulate 610, 639, 649 the operational behavior of an instruction. A disassembler 638, 648 is also included in the library. Information on ARM processors and especially the ARM and Thumb instruction set can be found in reference 5.

ATAlgorithms Library 122

This library contains all the algorithms that make ATOM work in the first place; the main functionality is implemented via these algorithms.

StructureBuilder Algorithm

The task of this algorithm is to create the structure of the CFG from the binary data stored in a binary executable file produced by e.g. Texas Instruments tools. The process has three main steps: reading the data from the file, analyzing the binary data (i.e. the instructions) and determining the boundaries of basic blocks and finally building the structure of the CFG. The handling of binary executable files (in this embodiment, COFF) is straightforward using the ATCOFF library 124.

Determining Leaders 706

Determining basic block leaders is itself a complex process. It has to determine the boundaries of single-entry/single-exit blocks of code.

The following techniques are used for determining the leaders: in every text section of the COFF file we look for symbols marking the beginning of a function and for symbols marking positions where the compiler switches instruction sets. All these positions are leaders of basic blocks. Moreover, symbols marking constants between instructions are being looked for. These symbols also start a new basic block. Next, in both text and data sections relocation information is searched and for every relocation entry marking a 32-bit address a new basic block is started at the position of the entry and also at the position where it refers. Finally, based on the information collected hitherto the instructions are analyzed in text sections and the successors of branch instructions (PC modifying instructions) and the targets of them marked as basic block leaders. There are eight additional basic block leaders: the program entry point stored in the COFF file is a leader and the seven exception vectors stored on memory positions 0x00, 0x04, 0x08, 0x0C, 0x10, 0x18, 0x1C are also basic block leaders.

Since ATOM can be instructed to handle some sections specifically—namely not to analyze them—we need a different analysis for these special sections. The only analysis we perform on these do-not-analyze sections is to check the relocation information associated with those sections and look for entries marking 32-bit addresses and branch-and-link instructions.

Building the Structure 708

First a section node is inserted into the CFG for every loaded text and initialized data section in the COFF file. The original name, index, virtual and physical addresses of the sections are stored into the nodes. Then the building of the CFG structure is started according to the leader information collected in the previous step.

Every text section is split into functions according to the collected symbols. For every function, a function child node is attached to the section node corresponding to the containing section. Two special nodes are attached to every function node: an exit block node and an unknown block node. Then for those functions whose first instruction is the target of a relocation entry a call edge is added to arc from the unknown function node to the function node.

Next, constructing basic blocks is started. Every leader starts a new basic block, so for every leader a new basic block node is created and attached to its containing function node. The body of a basic block consists of bytes between two leaders. From these bytes data, THUMB and ARM nodes are built based on the information collected before (instruction set changes, relocations, constants), and attached to the basic block nodes. Additionally, for every basic block whose first instruction is the target of a relocation entry a control edge is added to arc from the unknown block of the parent function node to the basic block node.

The construction of data sections is easier. A 'dummy' function and a 'dummy' basic block node is attached to the section node and data nodes to represent the contents of the section are created.

Do-not-analyze sections have to be handled in a special manner during this step also. 'Dummy' function and basic block nodes are attached to the section node and data and instruction nodes created to represent the contents of the section. (This is the only case where data and instruction nodes are mixed in a basic block.)

ControlFlowAnalyzer Algorithm 710

Figure 7B:
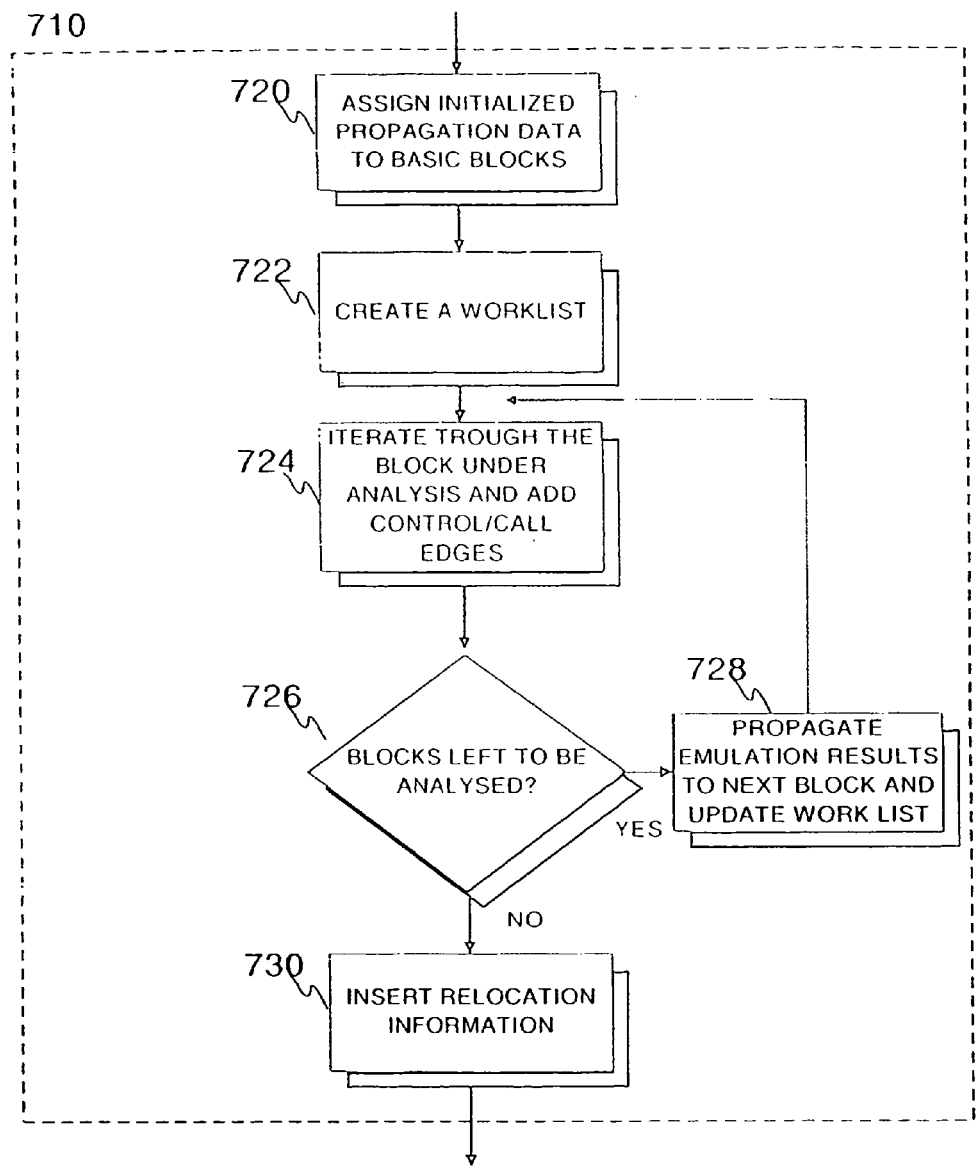
FIG. 7B discloses a flow diagram of program control flow analysis during the CFG creation process.

The task of this algorithm is to extend the structure of the CFG with control flow information as precise as possible. The analysis first determines the control flow and then inserts relocation information into the graph; see FIG. 7B for clarification.

Analyzing Control Flow

Once the structure of the CFG is ready the control flow of the program is analyzed to complete the CFG. A constant propagation technique is used in performing the analysis. The constant propagation technique is based on the "Conditional Constant" algorithm described in reference 7.

In the constant propagation algorithm constants are propagated through registers and condition code flags. Therefore, constant propagation information is first assigned to every basic block containing instructions. This constant propagation information carries the values of all registers and condition code flags. The value of a register can be a constant if the analysis shows that the content of the register is always equal to that constant before the execution of the block; it can be unknown if there is no knowledge yet about the concrete value of the register, or it can be unpredictable if the content of the register is not constant. The value of every register and condition code flag for every block is initialized to unknown, except for the PC (Program Counter) register, which is initialized to the address of the first instruction of the blocks 720.

After initialization a worklist is created 722, which will contain basic block nodes that need analysis. The worklist is initialized with the basic block found at the program entry point and the basic blocks corresponding to the exception vectors. Then the worklist algorithm is started, which is in fact a loop that in every step fetches and removes a block from the worklist and analyzes it 724.

The analysis of a block is as follows. The constant propagation information currently associated with the block is taken under the spotlight; it is iterated through the instructions in the block and emulated their behavior with the help of the ATInstructions library 726. The input of the emulation of the first instruction of the block is the constant propagation information associated with the block, while the input of every subsequent instruction is the output of the emulation of the preceding instruction. After the iteration the output of the emulation of the last instruction and the last instruction itself are used to infer how the block behaves.

If the last instructions form a function call (for example, BL instruction in both ARM and Thumb instruction sets for direct function calls, while "MOV LR, PC; BX Rs" or "MOV LR, PC; MOV PC, Rs" sequences in Thumb instruction set and "MOV LR, PC; LDR PC, . . . " or "MOV LR, PC; BX Rd" sequences in ARM instruction set for indirect calls), then it is handled specially. It is checked whether the output value of PC is constant or not (which is possible for indirect calls). If PC is not constant the unknown function is set as the target of the call. If PC is constant but the code called is outside the CFG or inside an unanalyzed section the unknown function is again set as the target of the call. Otherwise it is checked whether PC points to the first instruction of a function or not, in which case it is considered as a long branch. If it turns out that PC points to the first instruction of a function then the pointed function is the target of the call. Finally a call edge is inserted from the analyzed basic block to the target function as well as a return edge from the exit block of the target function to the succeeding block of the analyzed basic block. Additionally, the output of the emulation of the block is propagated to the first block of the target function (except if it is the unknown function).

If the last instruction of the analyzed block was a software interrupt, then it also needs special handling. Since SWI (Software interrupt) instructions are used to run code that is outside the scope of the currently running program, we cannot assume anything about it. The only assumption made is that the instruction will return control to the caller (although this may not be always the case, which makes this assumption safe but conservative). So a control edge is inserted into the CFG arcing from the analyzed block to the next block in CFG but in the output of the emulation of the block all registers and condition code flags are set to unpredictable before propagating it.

If the last instructions of the block form a 'return from function' then a control edge is inserted into the CFG that connects the analyzed block with the exit block of the containing function. In the specific case of ARM/Thumb, the following instruction sequences are considered as 'return from function' sequences: MOV PC, LR; BX LR; POP { . . . ,PC}; "POP {Rx}; BX Rx"; "POP {Rx}; ADD SP, #imm; BX Rx"; "POP {Rx}; ADD SP, #imm; MOV PC, Rx". The output of these blocks is propagated alongside the return edges starting from the exit block. The propagation takes register saves/restores into account If the last instruction of the block does not need special handling the output of the emulation of the last instruction is analyzed. If in the output the PC register is not constant, we have to handle an unresolved indirect jump, a control edge is inserted into the CFG arcing from the analyzed block to the unknown block node of the containing function and the output of the emulation is propagated to all the blocks reachable from the unknown block. If the value of the PC is constant then the successor of the block can be determined and a control edge inserted into the CFG arcing from the analyzed block to the successor block and the output of the emulation propagated to the successor. In some cases (e.g. for conditional branch instructions) the emulation may have multiple outputs (one for every possible outcome of the execution of the instruction; it makes more sense to produce a list of outputs where the value of the PC is different in every entry in the list than to produce only one, where the value of the PC is unknown—it is more informative). In such a case every output is dealt with as described above.

An instruction may also jump from inside a function into the middle of another function. In such cases after the instruction has been handled normally a 'compensation' control edge is inserted into the CFG that arcs from the exit block node of the called function to the exit block node of the caller function.

The propagation between blocks works as follows. If the result of the emulation of a block is propagated to another block, the information stored in the result is merged into the constant propagation information associated with the target block 728. This is called the meet operation. On every register and condition code flag the meet operation is applied: if one of the values (one from the result, one from the associated information) is unknown then the result of the operation will be the other value. If one of the values is unpredictable then the result of the operation is unpredictable. Finally, if both values are constants and the same constants then the result is the given constant, else unpredictable. The result of this meet operation is written back to the associated information of the target block and if the meet operation changed it then the target block is inserted into the worklist. The worklist algorithm is continued until no blocks left to be analyzed 730.

Inserting Relocation Information

After the major part of building the CFG is done address edges are inserted into the CFG to maintain relocation information to be able to produce code from the CFG after compaction 732.

In data blocks an address edge is inserted for every address node into the CFG arcing from the address data node to the node of which address the address node contains. In blocks containing instructions the instructions, which contain PC relative offsets encoded in their binary representation, have to be analyzed. For these instructions an address edge is inserted into the CFG that arcs from the instruction to the node where it points. After this step the construction of the CFG is finished.

Referring to legend 712 of FIG. 7A, the CFG (and eventually the program it illustrates) may now be optionally exposed to code optimization algorithms some of which are presented in the following. It is obvious that also other code compaction methods may be applied than the ones below if found purposeful.

BranchUnconditionalizer Algorithm

Branch Unconditionalizer eliminates those conditional branch instructions, which always branch or never branch. This can be found out using the results of constant propagation. If an instruction happens to always branch (i.e. its condition always evaluates to true) it is replaced with an unconditional branch. If an instruction happens to never branch (i.e. its condition always evaluates to false) it is simply erased.

The UnreachableEliminator Algorithm

The unreachable elimination heavily depends on the CFG since it is mainly a graph traversal algorithm. First, the algorithm traverses through the CFG starting from the basic block corresponding to the program entry point and the exception vectors via control, call and address edges and finds the reachable parts of the graph. After the reachable parts of the CFG are found the unreachable parts of it are eliminated. Simply all code and data blocks that are found not to be reachable are deleted from the graph (function nodes that no longer contain any basic block nodes are also deleted afterwards).

SimpleRedundantEliminator Algorithm

This algorithm eliminates an instruction if every register and condition code flag it defines is constant before the emulation of the instruction and has the same constant value after the emulation. Instructions that modify the PC, the SP (Stack Pointer) or the memory are never eliminated.

RedundantLoadEliminator Algorithm

This algorithm eliminates the redundant load of local variables. Local variables reside on the stack and they are loaded using a stack accessing (e.g. LDR Rd, [SP, #imm]) instruction. The loading of the value of a variable into a register is considered redundant if by traversing backwards via control edges in the CFG on all paths the same instruction is found and neither the target register, nor the SP, nor the local variable have been defined.

RegisterLivenessAnalyzer & DeadCodeEliminator Algorithms

The register liveness analysis is based on the technique used in Squeeze, which is described in reference 8. The dead code eliminator algorithm uses the result produced by the register liveness analysis. Because this algorithm operates on individual instructions instead of basic blocks, it does a local register liveness analysis inside individual basic blocks for determining dead instructions. The pseudo code of the algorithm is the following:

```
for (each text section) {
    for (each thumb function) {
        for (each thumb basic block 'bb') {
            live = LiveOut(bb); // result from register liveness analysis
            for (each instruction 'n' in 'bb' in reverse order) {
                use = Use(n); // a set of registers used by instruction 'n'
                def = Def(n); // a set of registers defined by instruction 'n'
                if (def union live =0 and not hasSideEffect(n)) then
                    // 'n' is dead and has no side effect
                    eliminate n;
                else { // if 'n' is alive then calculate local liveness information
                    live = (live minus def) union use;
                }
            }
        }
    }
}
```

The hasSideEffect function checks whether an instruction has side effects that prevent the elimination of the instruction (e.g. eliminating branches or memory accesses). Currently the following instructions are considered to have side effects: MOV PC, Rd; ADD PC, Rd; BX; STR*; ADD SP, #imm; PUSH; POP; STMIA; SWI; conditional and unconditional branches; long branch with link.

The eliminate function marks an instruction for elimination. The real elimination happens after the algorithm above executed. This elimination deletes all marked instructions from the CFG. Basic blocks that no longer contain any instruction are also deleted from the graph. Similarly, all functions that no longer contain any basic blocks are deleted from the graph. To maintain the correctness of the CFG, if a basic block is deleted then the incoming control edges of the block are retargeted to the successor of the block.

BranchRationalizer Algorithm

This algorithm rationalizes conditional and unconditional branches after all compaction algorithms have been run. This means that it eliminates all branches that simply branch to the next instruction.

ExecutableProducer Algorithm

After all algorithms finished compacting the CFG, this algorithm writes back the information stored in the CFG into a new executable, see legend 714 of FIG. 7A. The algorithm achieves its goal in five passes over the CFG. First, it calculates the alignment of every data and instruction node in the CFG, then it assigns addresses to them, next it ensures that references encoded in instructions do not exceed limits, afterwards it rebuilds data nodes and instructions that need relocation and finally it writes the nodes out into an executable file. The five steps 1–5 are described in the following:

1) Aligning Instructions and Data

In this phase the algorithm assigns alignment information to every instruction and data node. It assures that in latter phases halfword and Thumb nodes will be halfword (2 bytes) aligned; and word, address and ARM nodes will be word (4 bytes) aligned. Some instructions may also need some special handling.

2) Assigning Addresses

In this phase the algorithm assigns an address to every instruction and data node. For every section it starts assigning from the address associated with the given section. During assignment the algorithm takes care to align basic blocks so that every node in the basic block is aligned properly according to the previously computed alignment information.

3) Range Checking

In this phase the algorithm replaces those instructions with instruction sequences, which refer to other parts of the CFG via PC-relative references that cannot be represented inside the range given by the instruction class.

4) Relocating Instructions and Addresses

In this phase the algorithm rebuilds those instruction and data nodes that contain absolute or relative addresses in their binary representation. For ARM/Thumb instructions these are the following: LDR Rd, [RC, #imm]; ADD Rd, PC, #imm; conditional and unconditional branches; long branch with link. For data nodes these are the address data nodes.

5) Writing Executable

In this final phase the algorithm writes out the information stored in the CFG into an executable file (e.g. COFF). It reuses the information contained in the original executable but clears everything that is somehow connected with the regenerated sections (i.e. raw data, relocations, symbolic information). The cleared information is then regenerated.

In every section raw data is regenerated from the CFG by concatenating the binary representation of every instruction and data node. If a basic block needed some padding then zeros are inserted into proper places. For every function a symbol is regenerated containing the name of the function and for every address data node a new relocation entry is produced. Additionally the entry point of the program is recomputed. After the necessary information is regenerated, the information is written out using the ATCOFF library.

Figures 4, 4A, 4B, 8:
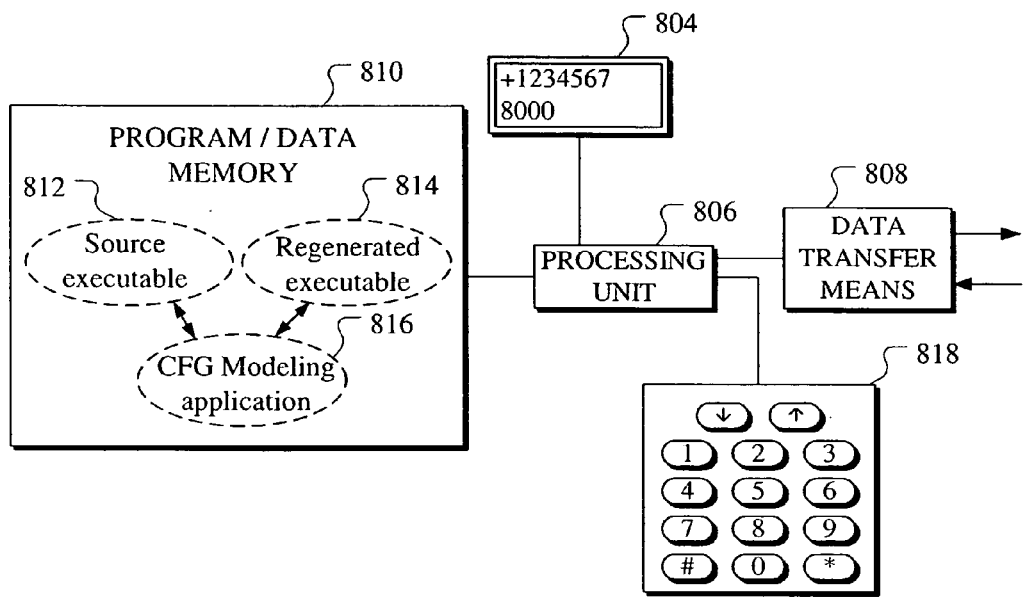
FIG. 8 is an exemplary block diagram of an electronic device, substantially a computer, capable of executing the method of the invention.

FIG. 8 depicts one option for basic components of a system like a pc computer or other electronic device capable of processing data in order to construct a CFG by the method of the invention. A memory 810, divided into one or more physical memory chips, comprises necessary control code 816, e.g. in a form of a computer program/application for CFG generation and necessary support functions like file handling, actual program data 812 the CFG of which is to be constructed and optionally regenerated program data 814 with optimised (compacted) code. Processing unit 806 is required for the execution of the method including the analysis and model reconstruction in accordance with instructions 816 stored in memory 810. Display 804 and a user interface like keypad 818 are optionally needed for providing necessary device control and data visualization means to the user. Data transfer means 808, e.g. a radio frequency transmitter or a fixed wire connection interface like a network adapter, a parallel/serial port or a high speed data bus are required for handling data exchange with other devices or data storages (and carrier medium thereof) such as hard drives, cdrom readers/writers (with cd's), floppy drives (with floppy disks), memory cards etc.

The scope of the protection sought for the invention can be found in the following claims. Utilized devices, method steps, data structures, environments, processor types etc may differ from the ones of this disclosure depending on the current scenario, still converging to the fundamental idea of the invention. It is thus clear that the invention may be executed in any kind of electronic device that bears necessary capabilities for performing the required data processing actions. The internal structure of program analyser and CFG creator application can also be implemented as desired; the disclosed ATOM—code minimizer is just given as an exemplary framework to handle the overall process around the core invention, the method of FIG. 7A.

REFERENCES

[1] Cristina Cifuentes and K. John Gough, A Methodology for Decompilation. XIX Conferencia Latinoamericana de Informática, Buenos Aires, Argentine, 2–6 Aug. 1993, pp. 257–266.

[2] Saumya K. Debray, et al, Compiler Techniques for Code Compaction. ACM Transactions on Programming Languages and Systems vol. 22 no. 2, March 2000, pp. 378–415.

[3] D J Delorie—DJGPP COFF Specification. http://www.delorie.com/djgpp/doc/coff

[4] Texas Instruments Inc, TMS470R1x Assembly Language Tool User's Guide. Literature No. SPNU118B, February 1997, Appendix A

[5] ARM Ltd, Arm7TDMI Data Sheet. http://www.arm.com, Document No. ARM DDI 0029E, 1995.

[6] IBM Rational Software, UML specification 1.5. Chapter 3: UML notation guide, http://www.rational.com/uml/index.jsp

[7] Mark N. Wegman, F. Kenneth Zadeck, Constant Propagation with conditional branches, ACM transactions on Programming Languages and Systems, Vol. 13, No. 2, April 1991, pp. 181–210.

[8] Robert Muth, Register Liveness Analysis of Executable Code. http://www.cs.arizona.edu/alto/papers/liveness.ps

The invention claimed is:

1. A method for execution on a signal processing unit for constructing a control flow graph from a computer executable program the instructions of which belong to one or more computer architecture instruction sets, said method comprising defining a number of block leader types including at least one type related to an instruction set change, block leaders specifying basic block boundaries in the program, said basic blocks including instructions or data, building a control flow graph structure comprising basic blocks found in the program, adding control flow and addressing information to said control flow graph by propagating through said basic blocks and internals of said basic blocks and stored on said memory device.

2. The method of claim 1, further comprising compacting said control flow graph by utilizing a control flow graft optimisation technique.

3. The method of claim 2, wherein said optimisation technique is at least one of the following: unreachable eliminator, branch unconditionalizer, simple redundant eliminator, redundant load eliminator, dead code eliminator, register liveness analyser, branch rationalizer.

4. The method of claim 1, wherein said adding control flow and addressing information includes iterating through instructions of a single basic block at a time based on constant propagation information associated with said block.

5. The method of claim 1, wherein said adding control flow and addressing information includes propagating basic block emulation results from a block to another.

6. The method of claim 1, wherein said block leader types further include an entry for at least one of the following: data symbols intermixed with instructions, program entry point, exception vector, relocation entry point, relocation target point, successor of a branch instruction, target of a branch instruction, function.

7. The method of claim 1, wherein the control flow graph comprises hierarchical levels of sections, functions and basic blocks.

8. The method of claim 1, further comprising reading data from a binary executable file.

9. The method of claim 1, further comprising re-constructing an executable from said control flow graph.

10. The method of claim 1, wherein said program is ARM or THUMB architecture specific.

11. A computer program comprising code for carrying out the steps of claim 1 for at least temporary storage in a computer readable medium.

12. A computer readable medium on which a computer executable program is stored for carrying out the steps of claim 1.

13. A system for constructing a control flow graph from a computer executable program, the instructions of which belong to one or more computer architecture instruction sets, said system comprising a processing device and a memory device for processing and storing instructions and data, and a data transfer device for accessing data, said system arranged to define a number of block leader types including at least one type related to an instruction set change, block leaders specifying basic block boundaries in the program, said basic blocks including instructions or data, said system further arranged to build a control flow graph structure comprising basic blocks found in the program, and to add control flow and addressing information to said control flow graph by propagating through said basic blocks and internals of said basic blocks and stored on said memory device.

14. The system of claim 13, further arranged to compact the control flow graph by utilizing a control flow graph optimisation technique.

15. A system for constructing a control flow graph from a computer executable program, the instructions of which belong to one or more computer architecture instruction sets, said system comprising a processing means and a memory means for processing and storing instructions and data, and a data transfer device for accessing data, said system arranged to define a number of block leader types including at least one type related to an instruction set change, block leaders specifying basic block boundaries in the program, said basic blocks including instructions or data, said system further arranged to build a control flow graph structure comprising basic blocks found in the program, and to add control flow and addressing information to said control flow graph by propagating through said basic blocks and internals of said basic blocks and stored on said memory device.

* * * * *